(12) United States Patent
Iwamura

(10) Patent No.: US 7,756,942 B2
(45) Date of Patent: Jul. 13, 2010

(54) SYSTEM AND METHOD FOR ESTABLISHING MASTER COMPONENT IN MULTIPLE HOME NETWORKS

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 732 days.

(21) Appl. No.: 11/446,438

(22) Filed: Jun. 2, 2006

(65) Prior Publication Data
US 2007/0022193 A1 Jan. 25, 2007

Related U.S. Application Data

(60) Provisional application No. 60/701,651, filed on Jul. 21, 2005.

(51) Int. Cl.
*G06F 15/16* (2006.01)
*H04Q 7/20* (2006.01)
*H04L 12/56* (2006.01)
*H04L 12/50* (2006.01)

(52) U.S. Cl. ............... 709/209; 709/208; 709/241; 370/329; 370/406; 370/386; 370/255; 455/518; 455/519

(58) Field of Classification Search ......... 709/223–226, 709/208–211, 238–244; 370/225–228, 329, 370/406, 386, 255; 455/518, 819
See application file for complete search history.

(56) References Cited

U.S. PATENT DOCUMENTS

| | | | |
|---|---|---|---|
| 5,812,557 A | 9/1998 | Stewart et al. ......... 371/20.1 |
| 6,459,692 B1 | 10/2002 | Ben-Michael et al. ........ 370/341 |
| 6,680,979 B2 | 1/2004 | Kato et al. ................. 375/260 |
| 2001/0028678 A1 | 10/2001 | Kato et al. ................. 375/222 |
| 2002/0044549 A1* | 4/2002 | Johansson et al. .......... 370/386 |
| 2002/0055978 A1* | 5/2002 | Joon-Bo et al. ............ 709/209 |
| 2002/0082035 A1* | 6/2002 | Aihara et al. ............. 455/518 |
| 2003/0023732 A1 | 1/2003 | Cohen ..................... 709/229 |
| 2003/0038710 A1 | 2/2003 | Manis et al. ........... 340/310.01 |
| 2003/0137986 A1 | 7/2003 | Kaku et al. ............... 370/449 |
| 2004/0075535 A1 | 4/2004 | Propp et al. ........... 340/310.01 |
| 2004/0136338 A1* | 7/2004 | Lin et al. ................. 370/329 |
| 2004/0208139 A1 | 10/2004 | Iwamura ................... 370/321 |
| 2004/0218688 A1 | 11/2004 | Santhoff et al. ........... 375/295 |
| 2004/0243684 A1 | 12/2004 | Ha et al. .................. 709/208 |
| 2004/0249903 A1 | 12/2004 | Ha et al. .................. 709/208 |
| 2004/0261101 A1 | 12/2004 | Iwamura .................... 725/32 |
| 2005/0185629 A1 | 8/2005 | Kuroda et al. ............. 370/347 |
| 2005/0190785 A1 | 9/2005 | Yonge, III et al. .......... 370/465 |
| 2005/0249245 A1* | 11/2005 | Hazani et al. ............. 370/485 |
| 2005/0262216 A1* | 11/2005 | Kashiwabara et al. ....... 709/208 |

OTHER PUBLICATIONS

"Powerline Telecommunications (PLT); Coexistence of Access and In-House Powerline Systems" ETSI TS 101 867 V1.1.1 (Nov. 2002).

* cited by examiner

*Primary Examiner*—Joseph E Avellino
*Assistant Examiner*—Thai N Nguyen
(74) *Attorney, Agent, or Firm*—John L. Rogitz

(57) ABSTRACT

Which device in a first home network is a master device is dynamically established based on the device reporting successful communication with a master device in a second home network, to ensure that the networks have master devices that can "se" each other for, e.g., managing bandwidth.

3 Claims, 4 Drawing Sheets

DEVICE VISIBILITY

ALGORITHM FOR MASTER

ALGORITHM FOR MASTER

DEVICE VISIBILITY AND MASTER HANDOVE

SYSTEM AND METHOD FOR ESTABLISHING MASTER COMPONENT IN MULTIPLE HOME NETWORKS

RELATED APPLICATION

This application claims priority from U.S. provisional application Ser. No. 60/701,651, filed Jul. 21, 2005.

FIELD OF THE INVENTION

The present invention relates generally to home network systems.

BACKGROUND OF THE INVENTION

Home network systems have been provided that can include a set-top box media server that communicates with various components in the home, e.g., TVs, laptop computers, and custom display devices. To establish network communication paths, power line communication (PLC) networks have been introduced and have gained in popularity owing to the fact that the home's existing AC power grid is used to also carry entertainment data between various components in the home network system which are plugged into AC wall sockets. In this way, no new wiring is required, rendering most home power grids into effective network backbones.

Further, home network systems can share PLC networks with other dwellings, e.g. a neighbor's home. Usually, each home establishes a logical network. Each logical network then has a master component, which is responsible for mediating bandwidth allocations to each of the other client components communicating in the home network. When a component wants to perform a contention-free communication with another component in the same home or another home, the component asks the master to give some bandwidth (time or frequency allocation) for the communication. The master then finds some available bandwidth and lets the neighbor's master component know the first master will use some available bandwidth on the PLC network shared by both houses. If no other master in the PLC network is using the desired bandwidth, the first master receives a confirmation from each neighbor's master component and proceeds with utilization of the desired bandwidth. If the desired bandwidth is already in use, the first master component typically receives a rejection and tries to find another bandwidth.

One problem encountered during this process is the existence of a "hidden" master component in one dwelling that may not be detected by a neighbor's master device. More particularly, the present invention understands that in some cases not all components in the home network operated by the first master can "see" each other. As critically recognized herein, if the master component happens to be at a particular hidden position and does not "see" a neighboring master component, a fatal problem can occur in that bandwidth management may not be possible.

SUMMARY OF THE INVENTION

A system includes a first home network in a first dwelling. The first home network has plural components, one of which is a first master, and the components in the first home network communicate with each other over a power line communication network, a Wi-Fi network, or an 802.11 network. A second home network is in a second dwelling and has plural components, one of which is a second master. The components in the second home network also communicate with each other over a PLC network or other network that shares bandwidth with the first network. A logic device executes in the first home network to transfer a master function away from the first master if the first master cannot detect the second master.

In non-limiting implementations the first and second masters communicate with each other for bandwidth management. The first master can transmit a query signal, and if the first master does not detect a response from the second master and a detecting component in the first home network detects a response from the second master, the master function is transferred to the detecting component. The logic device may be a processor in the first master.

In another aspect, a method is executable in a system that has a first home network with plural devices and a second home network with plural devices. The method dynamically establishes which device in the first home network is a master device based on the device reporting successful communication with a master device in the second home network.

In non-limiting implementations a master in the first home network transmits queries to non-master devices in the first home network, and each non-master device in the first home network that receives a query reports to the master including informing the master if the non-master device has received signals from a master other than the master in the first home network. Accordingly, if the master in the first home network receives a response from a first non-master device indicating that the first non-master device communicates with more masters than the master in the first home network, the master transfers master functionality to the first non-master device, which becomes the new master of the first home network.

In another aspect, a logic device has means for determining whether a master device in a first network adequately receives signals from a master device in a second network that shares bandwidth with the first network. The logic device also has means, responsive to a determination that the master device in the first network does not adequately receive signals from the master device in the second network, for transferring at least one master device function to a component in the first network other than the master device in the first network.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
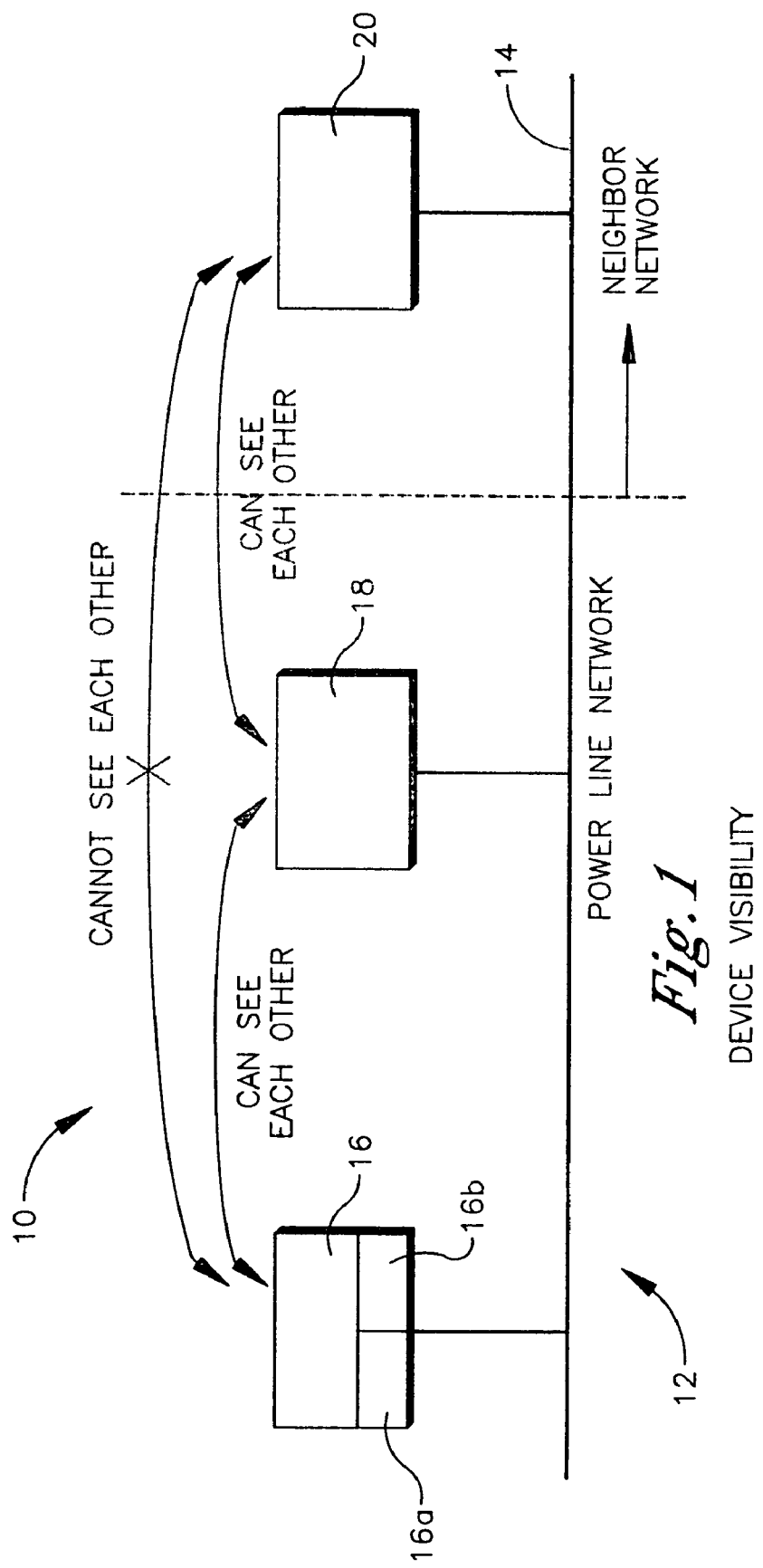
FIG. 1 is a block diagram showing two home networks in a power line communication (PLC) system.

Referring initially to FIG. 1, two home networks operating within a network 10 requiring bandwidth management are shown. The home networks overlap, because they share portions of the network 10, i.e., they share bandwidth with each other. The network 10 maybe, for example, a Wi-Fi network, an 802.11 network, or other wired or wireless network. In the example shown the network 10 is a power-line communication (referred to as PLC herein) network, and so will be referred as such for convenience without limiting the scope of the invention.

The network 10 contains plural individual home networks. FIG. 1 indicates the presence of only two home networks, a first home network 12 and a second home network 14, but it is to be understood that more home networks can be present. The first home network 12 has at least two components (home devices or appliances such as a television, DVD player, personal computer, etc.) 16 and 18 communicating over the home network 12, typically located in a first dwelling. The second home network 14 has at least one component 20, and typically has plural components located in a second dwelling. Component 16 in the first home network 12 is the initial designated master component for the home network 12. Component 20 in the second home network 14 is the initial designated master component for the home network 14. The master component 16 in the first home network may have a logic device 16a such as a processor that can execute the logic below, it being understood that the other components may also have respective processors executing logic that can be embodied as lines of software stored in logic storage 16b (in the case of the master 16), which may include solid state memories, disk storage, and the like.

Assuming that the component 18 in the first home network 12 possesses an ability to communicate with more components within the PLC network 10 than the initial master 16, master function capability can be transferred to the component 18. As illustrated in FIG. 1, the component 18 possesses better "visibility" over the entire PLC network and can easily communicate with both the component 16 within its own home network 12 and also the master component 20 of the second home network 14.

As set forth further below, a master component can transmit a query signal over the PLC network 10 that essentially requests reports from each receiver thereof at least as to the function (master or non-master) of the receiver, and how many masters have queried it. Responses to the query signal are also sent over the PLC network and hence are received by as many receivers that can "see" the transmitting component, with each receiver duly reporting back to the masters, based on the responses that the receiver intercepted, how many other receivers (and their reported functions) the receiver detected.

As an example, assume hypothetically that the master component 16 (the initial master on the first home network 12) itself receives query response reports from no other master component on the PLC network 10 because, e.g., the master component 16 is located in a "hidden" position on first home network 12 thus is not visible to the master component 20 of the second home network 14. Assume further that the non-master component 18 detects, over time, two query signals, one received from the master component 16 and the other from the master component 20. This means that the non-master component 18 has better overall visibility than the master component 16, and consequently, as set forth further below, the master function of the first home network can be transferred from the component 16 to the component 18.

Figure 2:
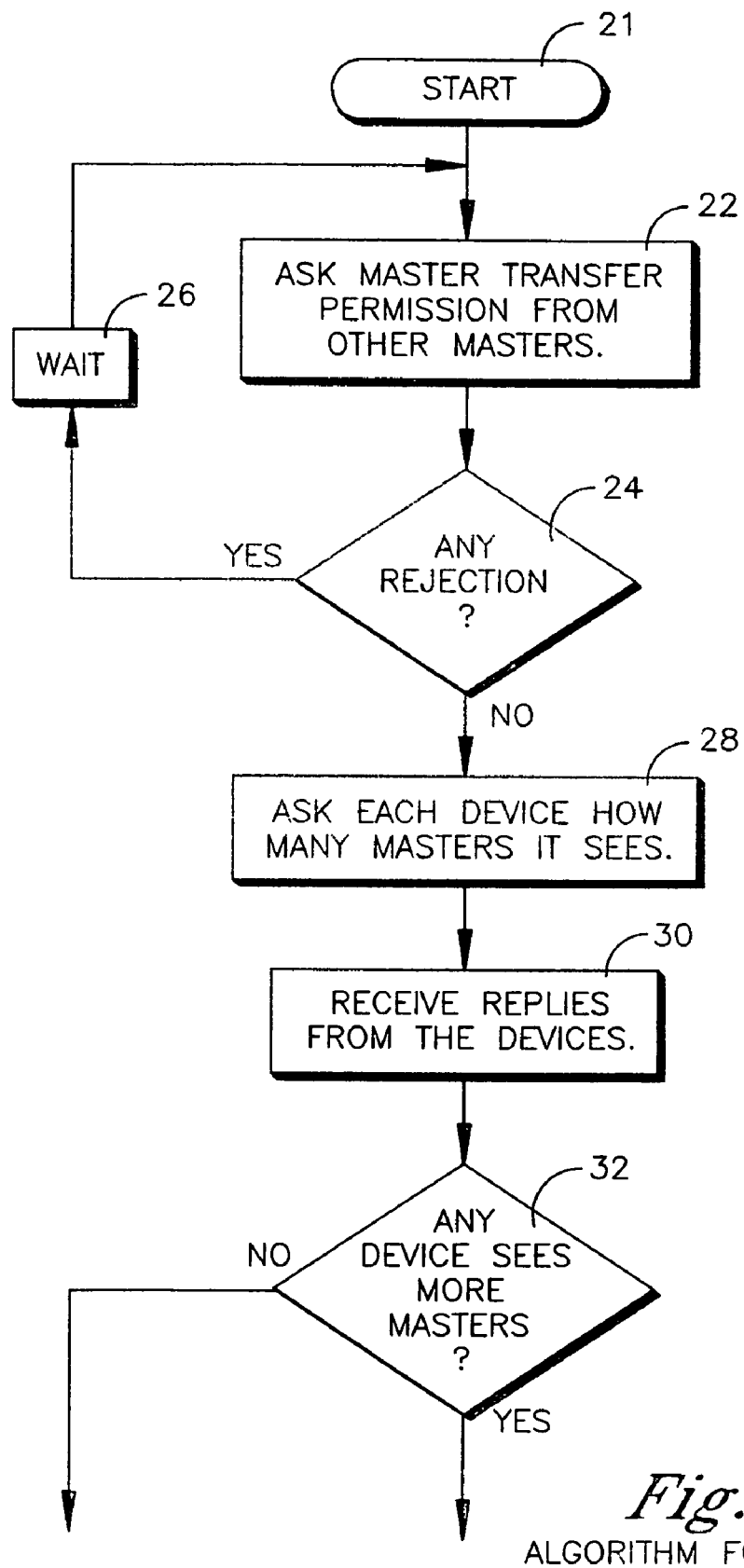
FIG. 2 is a flow chart of exemplary logic in accordance with present principles.
Figure 2:
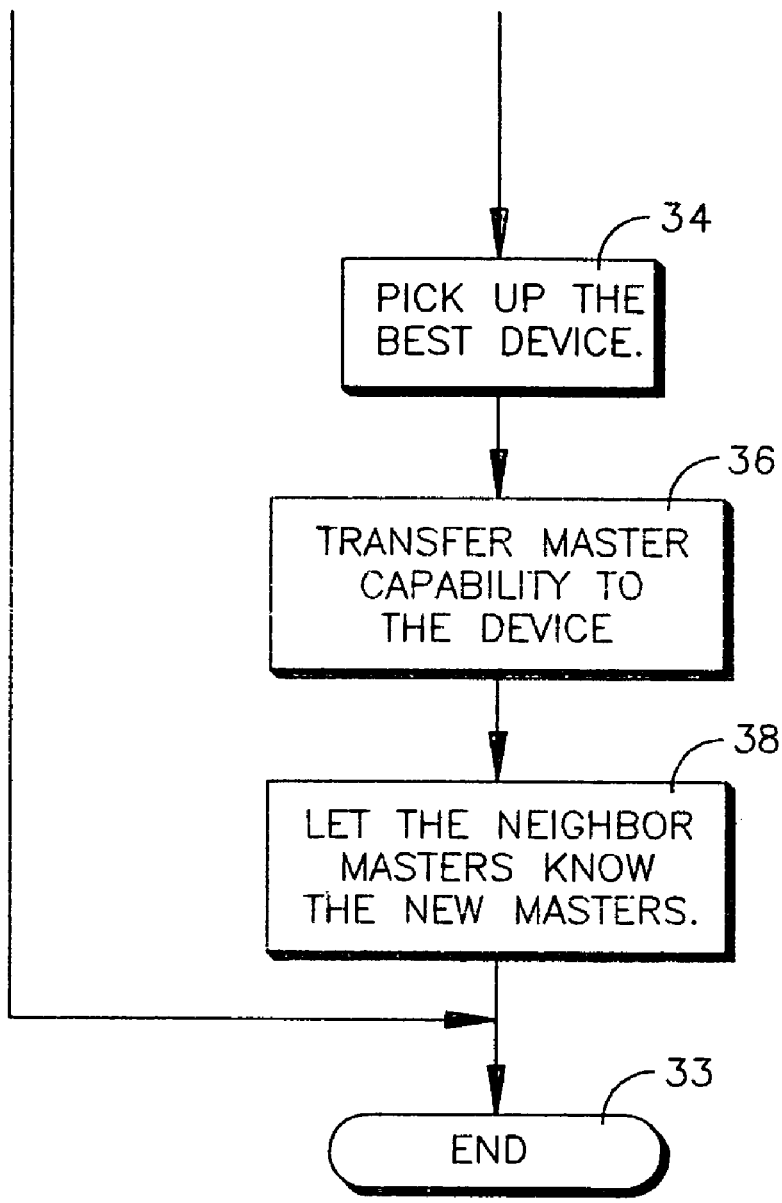

Now referring to FIG. 2, the logic for determining the appropriate master component (also referred to simply as "master") for each home network on the PLC network 10 is shown. Beginning at state 21, the logic flows to block 22 wherein the master 16 requests permission to conduct potential master transfer testing. At decision diamond 24, it is determined whether there is any rejection of permission. In essence, decision diamond 24 determines if there are other neighboring masters currently performing a master transfer test, in which case the other master would deny the requesting master permission. Thus, decision diamond 24 ensures that only one master transfer can take place on the PLC network 10 over a specific time interval. If the logic determines that another master transfer is occurring, the logic waits for a specified amount of time (e.g. five minutes) at block 26 and then reverts back to box 22, where the logic begins again.

If permission is granted (no rejection is determined) at decision diamond 24, the logic moves to block 28 where the master 16 asks, via query signals, each component of the same home network how many other masters it can see on the PLC network 10. Moving to block 30, the master 16 receives replies from all the components on the PLC network 10. Each component on the PLC network 10 thus in essence exchanges data regarding the number of master components it can communicate with, or "see" on the PLC network 10.

At decision diamond 32, the logic determines whether any other component on the same home network can see (i.e., has communication with) more neighboring masters than the original master 16. If no other component is able to see more neighboring masters than the original master, the logic ends at state 33 with master capability staying with the original master 16.

In contrast, if one component (e.g., the component 18) on the first home network detects more masters (e.g., the second master 20) than the original master 16 detects, the master 16 selects the "best" component to which master capability should be transferred at block 34, i.e., the master 16 selects as prospective new master the component 18. Moving to block 36, the master 16 then transfers master capability to the component 18. The final block 38 communicates to the neighboring masters so that they know that master capability on that particular home network has been transferred to the new master 18.

Figure 3:
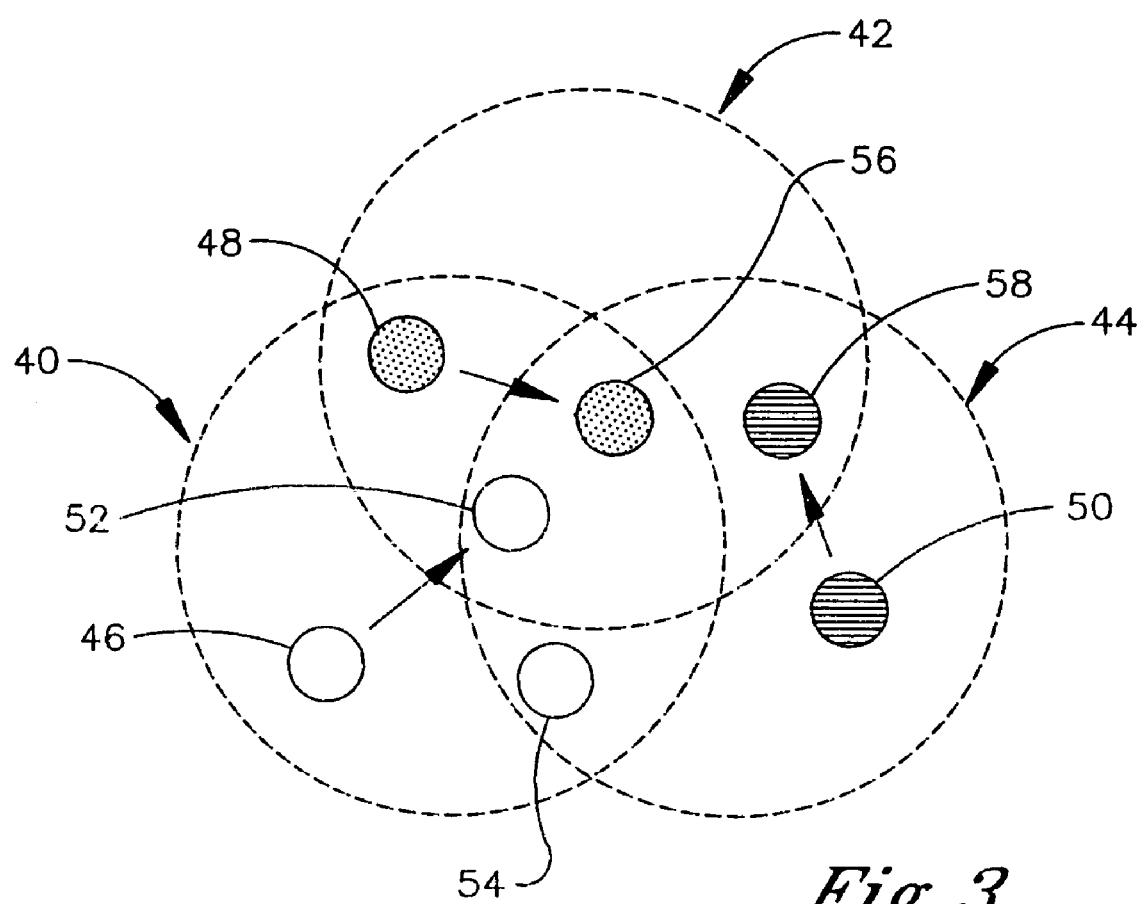
FIG. 3 is a schematic diagram of three home networks to illustrate the logic of FIG. 2.

With reference to FIG. 3, an example is shown to further illustrate the process of FIG. 2 of selecting the most capable component in a home network that possesses optimum capabilities as a master. Three home networks located within a PLC network are shown, generally designated 40, 42, and 44. It is to be understood that more or less home networks can function within the PLC network, but only three are shown in the current figure.

Component 46 is the designated master for the first home network 40, component 48 is the designated master for the second home network 42, and component 50 is the designated master for the third home network 44. Each master is bold-circled on FIG. 3 for clarification.

For the first home network 40, the master 46 is accompanied by a non-limiting number of plural components operating from within the first home network, designated components 52 and 54 in FIG. 3. In the second home network 42, the master 48 is accompanied by at least one other component 56 operating from within the home network 42. Lastly, the third home network 44 has at least one more component 58 operating under the same home network as the master 50. Each component operating from its own home network can also communicate, or "see", the components of another home network that overlap the first home network's circle in FIG. 3.

In this particular instance, master 46 of home network 40 not only sees other local components 52 and 54, but also master 48 and component 56 of home network 42. Master 48 of home network 42 can see remote components 52 and 58, as well as local component 56, but can see no other masters. Master 50 of home network 44 sees remote components 52, 54, 56 as well as the local component 58, but no other masters.

Beginning with home network 40, each of components 46 (master), 52, and 54 of the home network 40 decide (and report) the number of neighboring masters each can see. Accordingly, master 46 sees only one other master, 48, because only master 48 is in master 46's visible circle, whereas master 50 is outside the viewing range for master 46. Component 52 can see both master 48 and master 50 because component 52 is in the overlapped area of the three circles. Component 54 can see master 50, but cannot see master 48.

Under these circumstances, component 52 has the best visibility in the first network 40 in terms of being able to see the other masters on the PLC network. As a result, component 52 becomes the new master of home network 40. In the case of the home network 42, master 48 sees only master 46, but component 56 sees both master 46 and master 50. Therefore, component 56 becomes the new master of home network 42. The same logic can be used for the final home network 44 where master 50 sees no neighbor master, but component 58 sees master 48 and hence becomes the new master of home network 44. In short, a component with the most overlapping area is picked first, second most overlapping area is picked second, etc.

Preferably, two or more master transfers are not performed simultaneously, but rather sequentially, because a first master transfer might render a second master transfer unnecessary. As an example, if components 52 and 56 in FIG. 3 become new masters, no further transfer of a master function away from component 50 would be necessary, since component 50 can see components 52 and 56.

While the particular SYSTEM AND METHOD FOR ESTABLISHING MASTER COMPONENT IN MULTIPLE HOME NETWORKS is herein shown and described in detail, it is to be understood that the subject matter which is encompassed by the present invention is limited only by the claims.

What is claimed is:

1. A system communicating with a first home network, in a first dwelling, the first home network having plural components, one of which is a first master, the system further communicating with a second home network in a second dwelling, the second home network having plural components, one of which is a second master, the system comprising:

a digital processing circuit executing in the first home network to transfer a master function away from the first master if the first master cannot detect the second master because signals between the masters are obstructed such that the first master no longer has any master function, wherein the first master transmits a query signal, and if the first master does not detect a response from the second master and a detecting component in the first home network detects a response from the second master, the master function is transferred to the detecting component, wherein the digital processing circuit resides on the first master, after transferring the master function away, assuming a role of slave searching for other masters;

wherein the first and second masters communicate with each other for bandwidth management;

wherein the components in the first home network communicate with each other over a power line communication network and the components in the second home network communicate with each other over a power line communication network.

2. The system of claim 1, wherein the processing circuit is in the first master.

3. A logic device, comprising: a processor determining whether a master device in a first network adequately receives signals from a master device in a second network that shares bandwidth with the first network;

and the processor, responsive to a determination that the master device in the first network does not adequately receive signals from the master device in the second network, transferring at least one master device function to a component in the first network other than the master device in the first network, wherein the master device transmits queries to non-master devices in the first network, and each non-master device in the first network that receives a query reports to the master device including informing the master device if the non-master device has received signals from the second master, wherein if the master device in the first network receives a response from a first non-master device indicating that the first non-master device communicates with the second master, the master device transfers master functionality to the first non-master device, which becomes the new master device of the first network, wherein non-master devices in the first network do not appear in the second network, wherein after transferring the master function away, the master device assumes a role of slave searching for other masters, wherein the first and second networks are first and second PLC networks.

* * * * *